US010325595B2

(12) United States Patent
Chen et al.

(10) Patent No.: US 10,325,595 B2
(45) Date of Patent: *Jun. 18, 2019

(54) CONVERSATIONAL AGENT RESPONSE DETERMINED USING A SENTIMENT

(71) Applicant: Google LLC, Mountain View, CA (US)

(72) Inventors: Johnny Chen, Sunnyvale, CA (US); Thomas L. Dean, Los Altos Hills, CA (US); Qiangfeng Peter Lau, Mountain View, CA (US); Sudeep Gandhe, Sunnyvale, CA (US); Gabriel Schine, Los Banos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,975

(22) Filed: Apr. 30, 2018

(65) Prior Publication Data

US 2018/0247649 A1 Aug. 30, 2018

Related U.S. Application Data

(63) Continuation of application No. 15/464,935, filed on Mar. 21, 2017, now Pat. No. 9,997,158, which is a
(Continued)

(51) Int. Cl.
*G10L 15/00* (2013.01)
*G10L 15/18* (2013.01)
(Continued)

(52) U.S. Cl.
CPC .......... *G10L 15/22* (2013.01); *G06F 16/3329* (2019.01); *G06F 21/6245* (2013.01);
(Continued)

(58) Field of Classification Search
None
See application file for complete search history.

(56) References Cited

U.S. PATENT DOCUMENTS 9,418,663 B2 * 8/2016 Chen ..................... G10L 17/22
9,601,115 B2 * 3/2017 Chen ..................... G10L 17/22
(Continued)

FOREIGN PATENT DOCUMENTS

EP 2273491 1/2011
WO 2000/65773 11/2000
(Continued)

OTHER PUBLICATIONS

"Google Now", Wikipedia, the free encyclopedia, downloaded from the internet on Jun. 9, 2014, 6 pages, http://en.wikipedia.org/wiki/Google_Now.
(Continued)

*Primary Examiner* — Satwant K Singh
(74) *Attorney, Agent, or Firm* — Fish & Richardson P.C.

(57) ABSTRACT

Methods, systems, and apparatus, including computer programs encoded on computer storage media, for handing off a user conversation between computer-implemented agents. One of the methods includes receiving, by a computer-implemented agent specific to a user device, a digital representation of speech encoding an utterance, determining, by the computer-implemented agent, that the utterance specifies a requirement to establish a communication with another computer-implemented agent, and establishing, by the computer-implemented agent, a communication between the other computer-implemented agent and the user device.

20 Claims, 4 Drawing Sheets

Related U.S. Application Data continuation of application No. 15/228,488, filed on Aug. 4, 2016, now Pat. No. 9,640,180, which is a continuation of application No. 14/447,737, filed on Jul. 31, 2014, now Pat. No. 9,418,663.

(51) Int. Cl.
| | | |
|---|---|---|
| G10L 15/22 | (2006.01) | |
| G10L 17/22 | (2013.01) | |
| H04L 29/08 | (2006.01) | |
| G10L 15/26 | (2006.01) | |
| G10L 13/00 | (2006.01) | |
| G06F 16/332 | (2019.01) | |
| G10L 13/033 | (2013.01) | |
| G10L 15/30 | (2013.01) | |
| G10L 13/08 | (2013.01) | |
| G06F 21/62 | (2013.01) | |

(52) U.S. Cl.
CPC ............ *G10L 13/00* (2013.01); *G10L 13/033* (2013.01); *G10L 13/08* (2013.01); *G10L 15/1815* (2013.01); *G10L 15/1822* (2013.01); *G10L 15/26* (2013.01); *G10L 15/30* (2013.01); *G10L 17/22* (2013.01); *H04L 67/104* (2013.01); *G10L 2015/223* (2013.01); *G10L 2015/228* (2013.01)

(56) References Cited

U.S. PATENT DOCUMENTS

| | | | |
|---|---|---|---|
| 9,640,180 B2 * | 5/2017 | Chen | G10L 17/22 |
| 9,997,158 B2 * | 6/2018 | Chen | G10L 17/22 |
| 2004/0176958 A1 | 9/2004 | Salmenkaita et al. | |
| 2004/0193420 A1 | 9/2004 | Kennewick et al. | |
| 2007/0265830 A1 | 11/2007 | Sidhu | |
| 2009/0204711 A1 | 8/2009 | Binyamin | |
| 2010/0114944 A1 | 5/2010 | Adler | |
| 2011/0282669 A1 | 11/2011 | Michaelis | |
| 2012/0143598 A1 | 6/2012 | Bandara | |
| 2012/0310850 A1 | 12/2012 | Zeng | |
| 2013/0086652 A1 | 4/2013 | Kavantzas | |
| 2013/0226580 A1 | 8/2013 | Witt-Ehsani | |
| 2013/0266925 A1 | 10/2013 | Nunamaker | |
| 2013/0304457 A1 | 11/2013 | Kang | |
| 2013/0325447 A1 | 12/2013 | Levien | |
| 2014/0277735 A1 | 9/2014 | Breazeal | |
| 2015/0169284 A1 | 6/2015 | Quast et al. | |

FOREIGN PATENT DOCUMENTS

| | | |
|---|---|---|
| WO | 2005/038775 | 4/2005 |
| WO | 2010/049582 | 5/2010 |
| WO | 2013/155619 | 10/2013 |

OTHER PUBLICATIONS

Cassell, Justine et al. "Designing and Evaluating Conversational Interfaces With Animated Characters", *Embodied Conversational Agents*, MIT Press, 2000, 5 pages.

Cassell, Justine et al., "Nudge Nudge Wink Wink: Elements of Face to Face Conversation for Embodied Conversational Embodied Conversational Agents,", *Embodied Conversational Agents*, MIT 2000, 29 pages.

McBreen, Helen et al., "Evaluating 3D Embodied Conversational Agents in Contrasting VRML Retail Applications", Workshop on Multimodal Communication and Context in Embodied Agents, Autonomous Agents 2001, held in conjunction with the Fifth International Conference on Autonomous Agents (AGENTS), 5 pages.

International Search Report and Written Opinion in International Application No. PCT/US2015/042048, dated Oct. 26, 2015, 12 pages.

* cited by examiner

CONVERSATIONAL AGENT RESPONSE DETERMINED USING A SENTIMENT

CROSS-REFERENCE TO RELATED APPLICATION

This application is a continuation of U.S. application Ser. No. 15/464,935, filed Mar. 21, 2017, which is a continuation of U.S. application Ser. No. 15/228,488, filed Aug. 4, 2016, which is a continuation of U.S. application Ser. No. 14/447,737, filed Jul. 31, 2014, the contents of each are incorporated by reference herein.

BACKGROUND

This specification relates to computer-implemented conversational agents.

A computer-implemented agent may interact with a user to provide the user with an interface for features of a device on which the computer-implemented agent executes or with which the computer-implemented agent is associated. For example, a computer implemented agent may execute on a mobile device, receive voice input from a user, and execute one or more actions in response to the voice input, such as retrieving search results responsive to the voice input and providing the search results to the user.

SUMMARY

In general, one innovative aspect of the subject matter described in this specification can be embodied in methods that include the actions of receiving, by a computer-implemented agent specific to a user device, a digital representation of speech encoding an utterance, determining, by the computer-implemented agent, that the utterance specifies a requirement to establish a communication with another computer-implemented agent, and establishing, by the computer-implemented agent, a communication between the other computer-implemented agent and the user device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The other computer-implemented agent might not be specific to the user device. The other computer-implemented agent may be different from the computer-implemented agent. Establishing the communication with the other computer-implemented agent and the user device may include establishing the communication with the other computer-implemented agent executing on another device and the user device. Establishing the communication with the other computer-implemented agent and the user device may include establishing the communication with the other computer-implemented agent and the computer-implemented agent. The computer-implemented agent may be for a first application on a user device and the other computer-implemented agent may be for a second, different application on the user device.

In some implementations, the method includes providing a representation of the utterance to the other computer-implemented agent. The representation may include a text representation of the utterance. The method may include receiving, by the computer-implemented agent from the other computer-implemented agent, another representation of a response to the utterance, and generating, using the other representation, data to cause a presentation of the response. The method may include determining, by the computer-implemented agent, settings, associated with the other computer-implemented agent, for the presentation of the response. The representation may include the digital representation of speech. Providing the representation of the utterance to the other computer-implemented agent may include providing data for a user who spoke the utterance to the other computer-implemented agent. Providing data for the user who spoke the utterance to the other computer-implemented agent may include determining privacy settings for the user, and providing the data for the user to the other computer-implemented agent according to the privacy settings.

In some implementations, the method may include receiving data representing properties of the other computer-implemented agent prior to receiving the digital representation of speech encoding the utterance. Receiving the data representing the properties of the other computer-implemented agent may include receiving a definition of a data flow for the other computer-implemented agent that identifies a response for the other computer-implemented agent given a particular type of input. Receiving the data representing the properties of the other computer-implemented agent may include receiving an identification of a particular style of speech for the other computer-implemented agent. Receiving the data representing the properties of the other computer-implemented agent may include receiving text-to-speech parameters for responses provided by the other computer-implemented agent. Receiving the data representing the properties of the other computer-implemented agent may include receiving a selection of a template that identifies a data flow for computer-implemented agents that identifies a type of response for the other computer-implemented agent given a particular type of input. The template may be for computer-implemented agents that provide online ordering services. The online ordering services may include online pizza delivery services.

The subject matter described in this specification can be implemented in particular embodiments so as to realize one or more of the following advantages. In some implementations, a system enables third parties to build voice input and output interfaces, e.g., computer-implemented conversational agents, for user devices, e.g., using an application programming interface. In some implementations, a system enables a computer-implemented agent to automatically initiate conversation between another computer-implemented agent and a user, e.g., to hand off a conversation, based on input received from the user, e.g., specific to the other computer-implemented agent. In some implementations, a hand off of a conversation between agents enables users who cannot, or do not wish to, physically interact with a device to interact with or receive information from different entities while using the device. For instance, a user may be disabled or a device may not include a touch interface, e.g., a touch screen or a keyboard.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
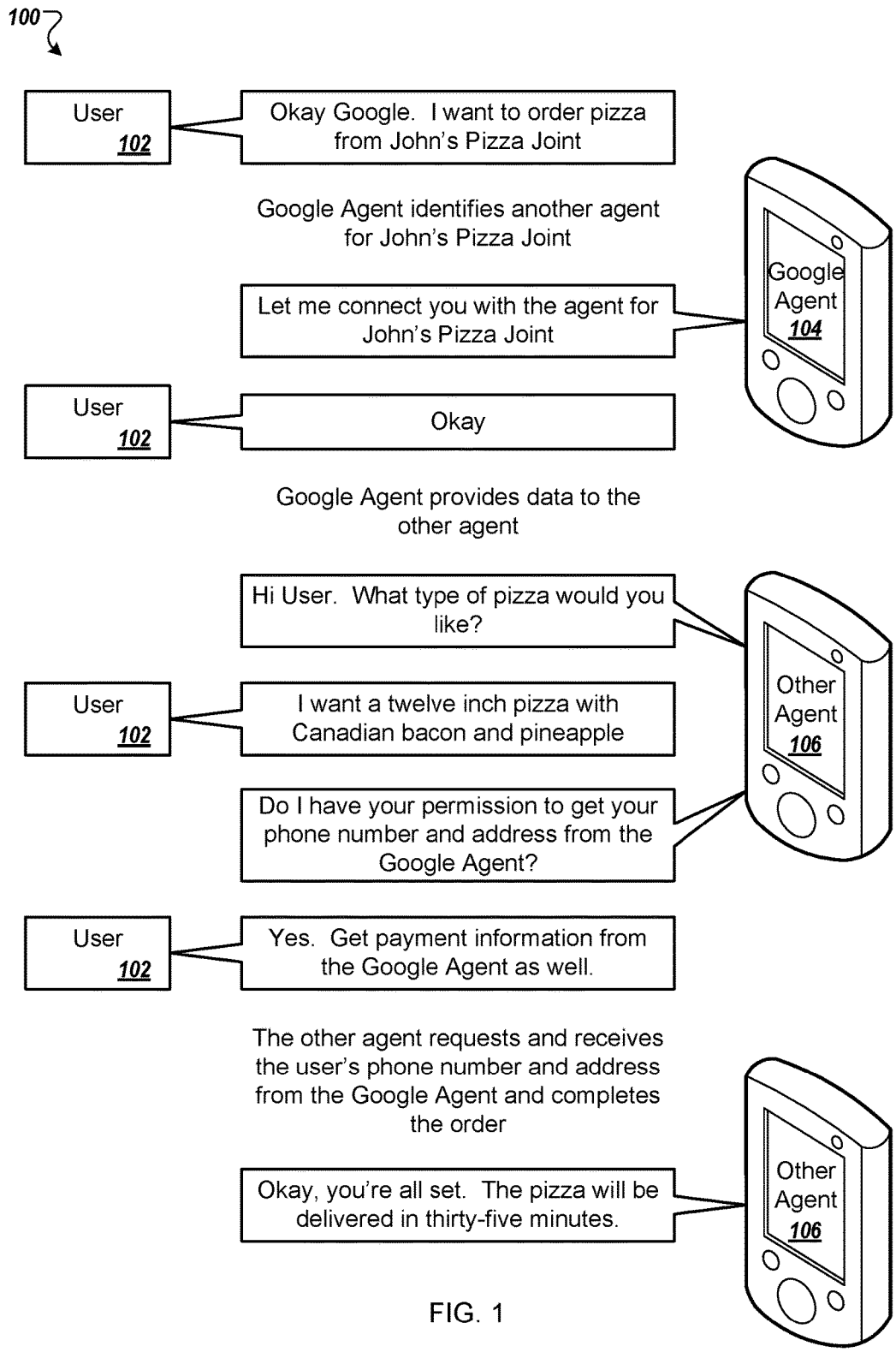
FIG. 1 is an example environment of a hand off between computer-implemented conversational agents.

A system may provide an extensible, feature rich, computer-implemented conversational agent platform that enables entities to quickly build conversational agents that can interact with users via a voice-in/voice-out interface. Each entity may use common features to create a custom conversational agent that helps users accomplish various tasks and achieve various objectives, e.g., associated with the entity.

The system may provide a user interface that enables third parties to author conversational agents, e.g., a set of conversation dialogs the conversational agent will use when interacting with a user. The third parties may create a conversational agent to describe a business of the third party, to interact with the users or customers of the third party, or both. The conversational dialogs may specify particular responses or questions for the conversational agent based on input received from the user.

Each of the third parties may specify a purpose for their conversational agent, e.g., to make airline reservations, tell jokes, allow a user to purchase movie tickets, etc. A third party may select a template, e.g., a default conversational flow, for a conversational agent that corresponds with the purpose of the conversational agent. For instance, a company that provides airline reservations may select a template for reservation conversational agents or airline reservation conversational agents and customize the template for their specific use or company, e.g., by customizing prompts and responses provided to a user.

Some of the customizations may include changing settings of the conversational agent, such as a particular style of speech, e.g., a particular language use or ways the agent responds to particular situations with the user, a particular voice, e.g., whether the agent has a male or female voice or a sound of speech, a particular language, e.g., as text-to-speech parameters, certain idioms and vocabulary, and/or custom commands for the agent, e.g., voice commands. In some examples, settings for an airline agent may indicate that the airline agent is very professional and business oriented and settings for a comedy club's agent may indicate that the comedy club agent is bubbly, edgy, and funny.

The system may include a platform that converts an authored conversational flow for a third party agent into a natural conversational user interface with a user. For instance, the platform may use the text-to-speech parameters for the agent and the agent's voice settings to convert a text response specified by the agent's conversational flow to an audio stream and audibly present the audio stream to a user.

The system may include automated error correction techniques that enable the system to interact with a user to determine an appropriate action in response to input that may not be clear. Some error correction techniques may prompt the user with yes-or-no questions or by offering a set of options from which the user can select. The questions and multiple choice queries may enable the system to resolve ambiguous references, e.g., "what does 'that' refer to?", assess the user's sentiment, e.g., "does that mean you like the last song?", and otherwise clarify the user's intent, e.g., "what did you mean by 'LOL'".

For example, one potential source of error may include unintelligible speech from a user, e.g., when the system's speech recognition system is unable to determine what the user said. In this example, one error correction technique may be to prompt the user to repeat what he said. Another potential source of error may include receipt of a command by the system with which the system cannot determine an appropriate response. In this example, the system may provide the user with some options from which he can select, e.g., options commonly selected by other users.

The system may provide error correction techniques to third parties so that each third party does not have to create error correct techniques themselves. For instance, a third party may select one or more error correction techniques specific to their industry, specific to a particular conversation flow template, or from a list.

The platform may allow a conversational agent for a user device to "hand off" a user conversation to another conversational agent, e.g., a specific third party conversational agent. For instance, the user may ask the conversational agent for the user device to recommend a restaurant and walk the user through the process of selecting a restaurant. Once the conversational agent for the user device receives a restaurant selection from the user, the conversational agent for the user device may ask the user whether the user would like to connect with a conversational agent for the selected restaurant or with a restaurant reservation conversational agent.

The third parties may make third party data available to the platform to allow the platform to use the data during a conversation flow. For example, a pizza delivery third party may provide the platform with access to the types of pizzas currently available to ensure that the platform does not allow a user to order a pizza that is not currently available, e.g., when some ingredients for specific types of pizzas are not available.

The system may also allow third party agents to hand off conversations to other third party agents. In some examples, the conversational agent for a user device may receive a request for a restaurant recommendation and may hand off the conversation to a restaurant's agent that provides the user with menu information. The restaurant's agent may then receive a request to make a reservation and hand off the conversation to a restaurant reservation agent, created by the same third party restaurant or by another third party, e.g., that manages restaurant reservations.

Example Operating Environment

FIG. 1 is an example environment 100 of a hand off between computer-implemented conversational agents. For example, a user 102 may initiate a conversation with a computer-implemented conversational agent 104 by saying "okay Google. I want to order pizza from John's Pizza Joint." The agent 104 receives the input, analyzes the input, and determines that another computer-implemented conversational agent 106 for John's Pizza Joint is available to assist the user in ordering a pizza from John's Pizza Joint. The agent 104 responds to the user 102 stating "let me connect you with the agent for John's Pizza Joint."

The agent 104 receives input from the user 102 saying "okay" and provides data to the other agent 106 about the conversation, e.g., that the user 102 wants to order a pizza, as part of a process to hand off the conversation to the other agent 106. The data does not include any information that identifies the user 102 unless the user 102 previously gave the agent 104 permission to release the user's identity to any other agents or to the specific other agent 106 for John's Pizza Joint, e.g., explicitly or in a setting.

The other agent 106 then communicates with the user 102, e.g., by asking the user 102 "what type of pizza would you like?" The other agent 106, and the agent 104, may interact with the user 102 through a platform, executing on a user device operated by the user 102 or on a server, that provides a text-to-speech interface for the agents, as described in more detail below.

The other agent 106 may receive a response from the user 102 indicating that the user 102 "wants a twelve inch pizza with Canadian bacon and pineapple" and prompt the user 102 whether the other agent 106 "has your permission to get your phone number and address from the Google Agent." When the other agent 106 receives a response "yes. Get payment information from the Google Agent as well" from the user 102, the other agent 106 retrieves the phone number, address, and payment information from the agent 104 and completes the order for the user 102. The other agent 106 may then inform the user 102 "okay, you're all set. The pizza will be delivered in thirty-five minutes."

When the other agent 106 does not receive permission from the user 102 to retrieve the user's phone number and address from the agent 104, the other agent 106 prompts the user 102 for his address, and phone number. The other agent 106 may prompt the user 102 for payment information. The other agent 106 may then provide the user 102 with delivery information, such as when the pizza is expected to be delivered.

Example System

Figure 2:
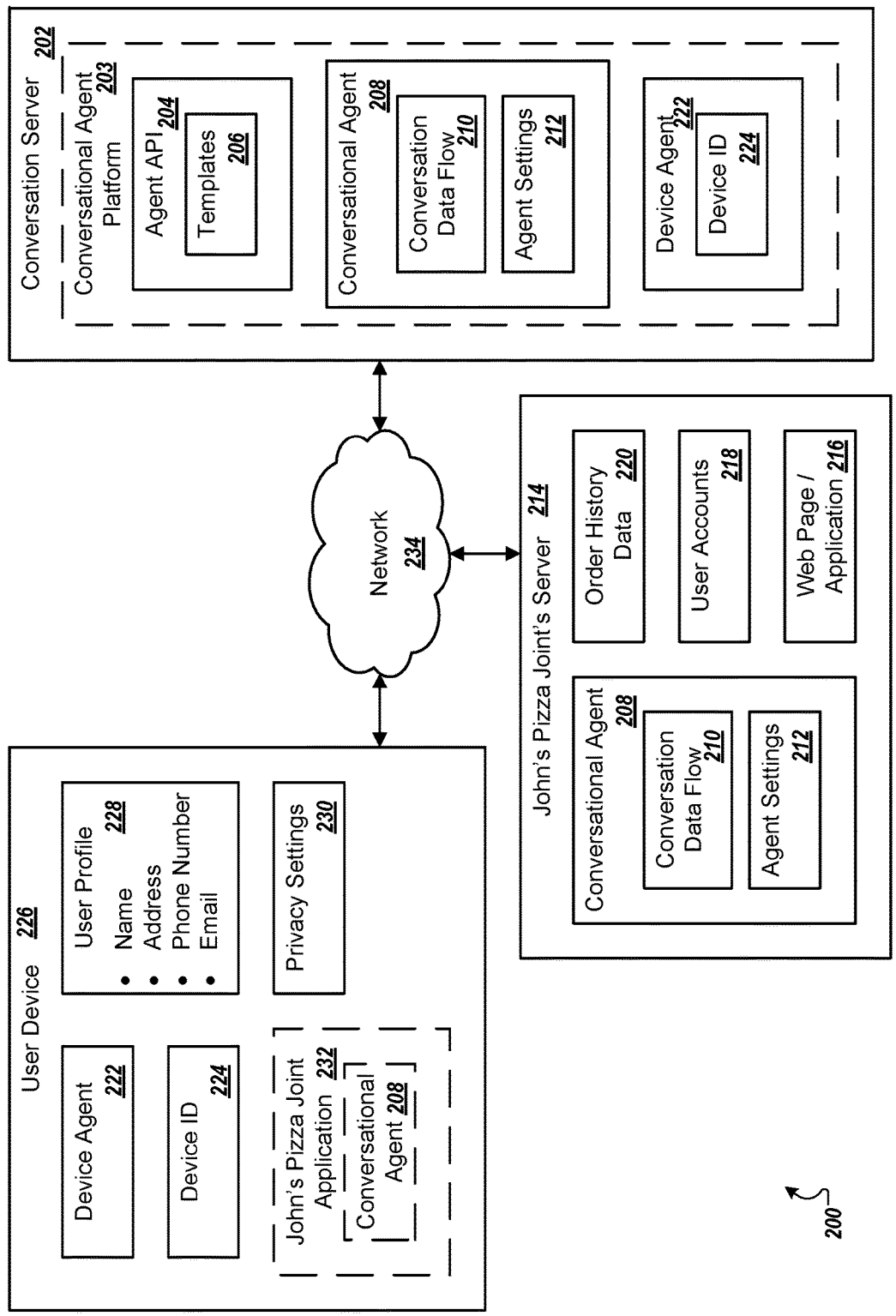
FIG. 2 is an example system in which an entity creates an agent that may receive a conversation hand off from a device agent.

FIG. 2 is an example system 200 in which an entity creates an agent that may receive a conversation hand off from a device agent. For instance, an administrator for John's Pizza Joint may access a conversation server 202, and a conversational agent platform 203 on the conversation server 202, to create a computer-implemented conversational agent 208. The administrator may access a conversational agent application programming interface (API) 204 that includes templates 206 for different types of conversational agents. The administrator may use the agent API 204 to create the conversational agent 208 using a template or without using a template. Some templates may include conversation data flows for online ordering, for any type of food service or particular types of food services, e.g., pizza delivery, ordering tickets, e.g., to a game or show or for an airline, getting movie recommendations or watching movies or television shows, e.g., online, etc.

The administrator may define a conversation data flow 210 and agent settings 212 for the conversational agent 208. The conversation data flow may include a series of questions and responses for the conversational agent 208 to use during a conversation with a user, e.g., based on expected prompt types or expected response types from the user. The conversation data flow 210 may include multiple different conversation data flows, e.g., for different interactions with a user. A first conversation data flow may allow the conversational agent 208 to provide a user with a menu for John's Pizza Joint, a second conversation data flow may provide a user with an interface to order a pizza from John's Pizza Joint, and a third conversation data flow may include multiple different flows depending on different types of input from the user, e.g., whether or not the user would like to order a side.

The agent settings 212 may include a particular style of speech, a particular voice, a particular language, custom commands, or a combination of any two or more of these. For example, the administrator may select a deep male voice with a certain accent as the particular voice. Some examples of styles of speech include serious, formal, bubbly, funny, and casual.

Data representing the conversational agent 208 may be stored on the conversation server 202, e.g., one or more computers that include data for multiple conversational agents, a server 214 for John's Pizza Joint, or both. The server 214 may be administered by the John's Pizza Joint entity, or may be managed on behalf of the entity by a third party.

When a user device 226 accesses a web page or an application 216 for John's Pizza Joint, a device agent 222, associated with the user device 226, may ask a user of the user device 226 if they would like to speak with the conversational agent 208, e.g., instead of using a visual user interface. When the user device 226 accesses an application 216 for John's Pizza Joint, the user device 226 may communicate with the application 216 executing on John's Pizza Joint's server 214 or may install the application, e.g., as John's Pizza Joint application 232 on the user device 226. The installation of the application 232 on the user device 226 may include data for the conversational agent 208 and when the user launches the application 232, e.g., by instructing the device agent 222 to launch the application 232, the conversational agent 208 may initiate a conversation with the user, e.g., the device agent 222 may hand off the user conversation to the conversational agent 208.

When the conversational agent 208 interacts with the user device 226, the conversational agent 208 may access user accounts 218 and order history data 220 for John's Pizza Joint. For example, the conversational agent 208 may ask a user of the user device 226 for account information, access that user's account using the account information, and determine recent orders for that user which are listed in the order history data 220. The conversational agent 208 may use the order history data 220 and the user accounts 218 to provide a recommendation on which pizza to order, to facilitate the order process, e.g., by determining the user's address rather than prompting the user for his address, or both.

The conversational agent 208 may gain access to the user's account or the order history data 220 by communicating with a computer-implemented device conversational agent 222 specific to the user device 226. The device agent 222 may execute on the conversation server 202, and be associated with the user device 226 by a device identifier 224 for the user device 226, or may execute on the user device 226. When the device agent 222 receives a request for data, e.g., user profile data 228, from the conversational agent 208, the device agent 222 may access privacy settings 230 for the user device 226, which are stored on the user device 226, the conversation server 202, or both, to determine what information may be shared with the conversational agent 208.

In some examples, the privacy settings 230 may indicate that the device agent 222 may provide the conversational agent 208 with the user's name, address, and phone number. The conversational agent 208 may use the user's name, address, and phone number to determine an account for the user and the user's order history.

The privacy settings 230 may indicate that particular data may be shared with some conversational agents and not shared with other conversational agents. In some examples, one of the conversational agents may prompt the user to determine what information may be shared between the conversational agents. The privacy settings 230, or other settings, may be updated using the response from the user.

The device agent 222 may initiate communications between the user device 226, e.g., the device agent 222, and the conversational agent 208. For instance, the device agent 222 may receive a request from a user of the user device 226 asking for a restaurant recommendation and identify John's Pizza Joint in response, or receive a request specifically asking to order a pizza from or view the menu of John's Pizza Joint. The device agent 222 connects the user device 226 with the conversational agent 208 for John's Pizza Joint to facilitate communication between the user and the conversational agent 208. For example, the communication may be between the user device 226 and the conversation server 202, or between the user device 226 and John's Pizza Joint's server 214.

Separate software, e.g., on the conversation server 202, may be used for the device agent 222 and the conversational agent 208 or the same software may be used for both agents. For instance, the server may have a single application, e.g., which is part of the conversational agent platform 203, that accesses different data, e.g., settings, for each of the agents and that provides an interface for communication with the user device 226 and the conversational agents. The single application may access the conversation data flow 210 to determine an appropriate response to a question or statement from the user and the agent settings 212 to determine how that response should be presented. The single application then generates data representing the response and provides that data to the user device 226 which uses the data to provide an audible response to the user.

In some examples, the device agent 222 may provide representations of input, e.g., text representations of utterances, to the conversational agent 208 to facilitate communication between the user and the conversational agent. The device agent 222 receives responses from the conversational agent 208, e.g., either text or audible responses, and provides the responses to the user. When the device agent 222 receives text responses from the conversational agent 208, the device agent 222 may use settings for the conversational agent 208 to generate and provide audible responses to the user.

In some implementations, an application for the third party, e.g., John's Pizza Joint, does not have to be installed on the user device 226 for the user to interact with a service provided by the third party. For example, the device agent 222 may determine that there is an agent for the third party service, e.g., the conversational agent 208. The device agent 222 may then communicate with the conversational agent 208, or the user device 226 may communicate with the conversational agent 208, to provide an audible interface to the user.

In these implementations data for the conversational agent 208 may be stored on John's Pizza Joint's server 214, the conversation server 202, or a combination of the two. For instance, the conversational agent 208 may execute on the conversation server 202 or data for the conversational agent 208 may reside on the conversation server 202, e.g., and be used by another application to generate response that will be presented to a user. The conversational agent 208 on the conversation server 202 may include information about data stored on John's Pizza Joint's server 214, such as how to access the user accounts 218, the order history data 220, or both. The executing conversational agent 208, or an application using data representing the conversational agent 208, may use this information stored on John's Pizza Joint's server 214 when communicating with the user device 226 and a respective user.

The user device 226 may include personal computers, mobile communication devices, and other devices that can send and receive data over a network 234. The network 234, such as a local area network (LAN), wide area network (WAN), the Internet, or a combination thereof, connects the conversation server 202, John's Pizza Joint's server 214, and the user device 226.

Example Process Flow

Figure 3:
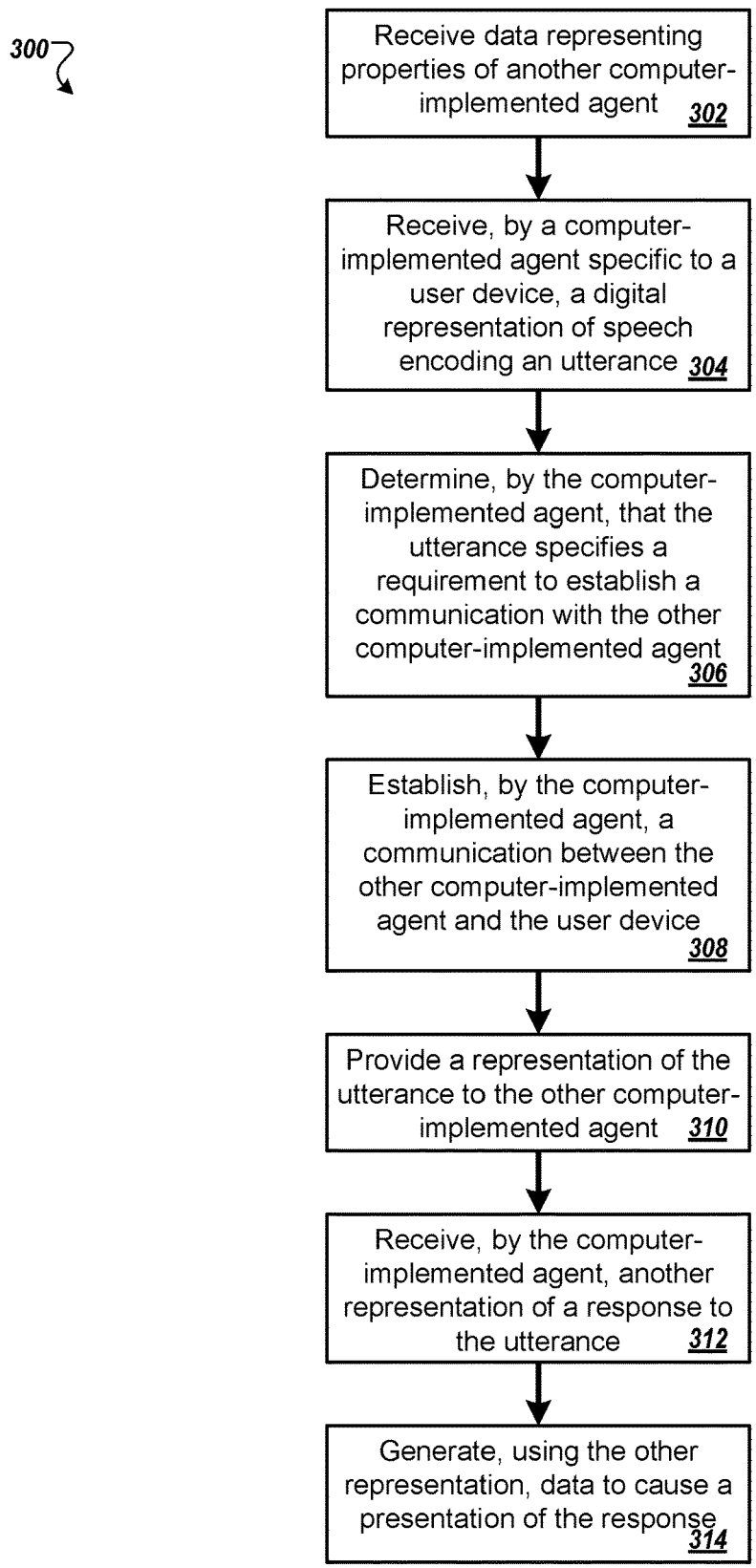
FIG. 3 is a flow diagram of a process for establishing communication between a user device and a computer-implemented conversational agent.

FIG. 3 is a flow diagram of a process 300 for establishing communication between a user device and a computer-implemented conversational agent. For example, the process 300 can be used by the conversation server 202 or the user device 226 from the system 200.

The process receives data representing properties of another computer-implemented agent (302). For example, a server receives a conversation data flow and other settings for the other agent from an administrator. In some examples, the server receives the settings for the other agent from another computer.

The process receives, by a computer-implemented agent specific to a user device, a digital representation of speech encoding an utterance (304). For instance, the agent receives a request from a user for a restaurant recommendation, asks the user if they would like to make a reservation at John's Pizza Joint, and receives a digital representation of the utterance "yes."

The process determines, by the computer-implemented agent, that the utterance specifies a requirement to establish a communication with the other computer-implemented agent (306). The agent determines that the other agent, specific to John's Pizza Joint or a restaurant reservation system, can assist the user in making a reservation at John's Pizza Joint.

The process establishes, by the computer-implemented agent, a communication between the other computer-implemented agent and the user device (308). For example, the agent hands off communication with the user to the other agent and creates a connection between the other agent and the user device. When the other agent executes on a server, the connection may be between the user device and the server. When the agent executes on a server and the other agent executes on another server, the connection may include multiple points, e.g., the user device, the server, and the other server. In some examples, both the agent and the other agent may execute on the same server and the agent establishes a connection between the user device and the server, e.g., the application that represents the other agent.

The process provides a representation of the utterance to the other computer-implemented agent (310). For example, the agent or the user device may provide the other agent with the digital representation of speech or a text representation of the utterance. The representation may include the specific utterance or may include content, e.g., words, related to the utterance. For instance, in this example the representation may indicate that the user is looking to make a reservation at John's Pizza Joint and may include a day, e.g., today, and/or a time, e.g., 6 PM, for the reservation, e.g., when the representation is provided to another agent for a restaurant reservation system.

The process receives, by the computer-implemented agent, another representation of a response to the utterance (312). For instance, the other agent determines a conversation data flow that corresponds with the representation of the utterance, identifies an action to perform, if any, from the conversation data flow, e.g., to determine whether or not the user can make a reservation at John's Pizza Joint, and generates an appropriate response to the utterance using the conversation data flow and data from the action. The other agent may determine that the user cannot make a reservation at 6 PM, e.g., because there is no availability at John's Pizza Joint at that time, but can make a reservation for 7 PM and provide a text representation of "we don't have any openings at 6 PM tonight, would 7 PM work for you?" to a server, e.g., executing the agent, or the user device.

In some implementations, an application uses a conversational data flow for the other agent to determine the response to the utterance. For example, the application uses data about the utterance, e.g., that the user is looking to make a reservation, to select the conversational data flow from multiple conversational data flows, e.g., a reservation conversational data flow, and generates a response to the user's utterance.

The process generates, using the other representation, data to cause a presentation of the response (314). For example, when the server receives the text representation, the server may generate an audio signal of the statement "we don't have any openings at 6 PM tonight, would 7 PM work for you?" using the settings for the other agent. In some examples, the user device receives the text representation, or an audible representation, from the other agent and audibly presents the response to the user.

One or more steps of the process 300 may repeat as the user requests additional information from the other agent and the other agent responds to the user's requests. For instance, the process may repeat steps 304, and 310-314 until the other agent completes a transaction with the user, e.g., finishes providing the user with information required by the user, or until the other agent determines that the conversation with the user should be passed to a different agent, e.g., and the other agent repeats steps 306-308 to hand off the conversation to the different agent.

The order of steps in the process 300 described above is illustrative only, and establishing communication between the user device and the computer-implemented conversational agent can be performed in different orders. For example, the process 300 may establish communication between the other agent and the user device and receive a representation of a response from the other agent and then receive a digital representation of speech encoding another utterance and provide a representation of the other utterance to the other agent.

In some implementations, the process 300 can include additional steps, fewer steps, or some of the steps can be divided into multiple steps. For example, the process 300 may include steps 304-308 and might not include one or more of the steps 302 and 310-314.

Optional Implementation Details

In some implementations, the other agent accesses one or more systems of a third party to provide responses or other information to a user. For instance, the other agent may receive a reservation request from a user or from an agent associated with the user's device, access a database, stored on the same server executing the other agent or a different server, to determine whether the user may make the requested reservation or if a different time is available, and generates a response based on the determination.

In some implementations, different agents, e.g., associated with the same entity or third party, may be used for different conversation data flows or different types of interactions with a user. For instance, a hotel may have a reservation agent, a concierge agent, and a room service agent. When a user requests information from the hotel, an agent on his device may determine a type of interaction for which the user is looking and the hotel agent that is most likely to assist the user with that interaction. In one example, when the device agent receives a request stating that "I'm thinking of stating at Hotel Fancy, but I want to know what's around Hotel Fancy. Let me talk to an agent at Hotel Fancy that can tell me what restaurants and activities are nearby." The device agent may then use keywords in the request to determine that the concierge agent is the agent most likely to have the information the user requested and create communication between the user device and the concierge agent to enable the concierge agent to communicate with the user.

In some implementations, a third party may have multiple agents for the same type of conversation data flow but different types of users. For example, a first agent may be used to interact with users that have a first type of demographic and a second agent, e.g., with a different voice or style of speech, may be used to interact with users that have a second type of demographic, different from the first type of demographic.

Additional Implementation Details

In situations in which the systems or agents discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the agents that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by an agent.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
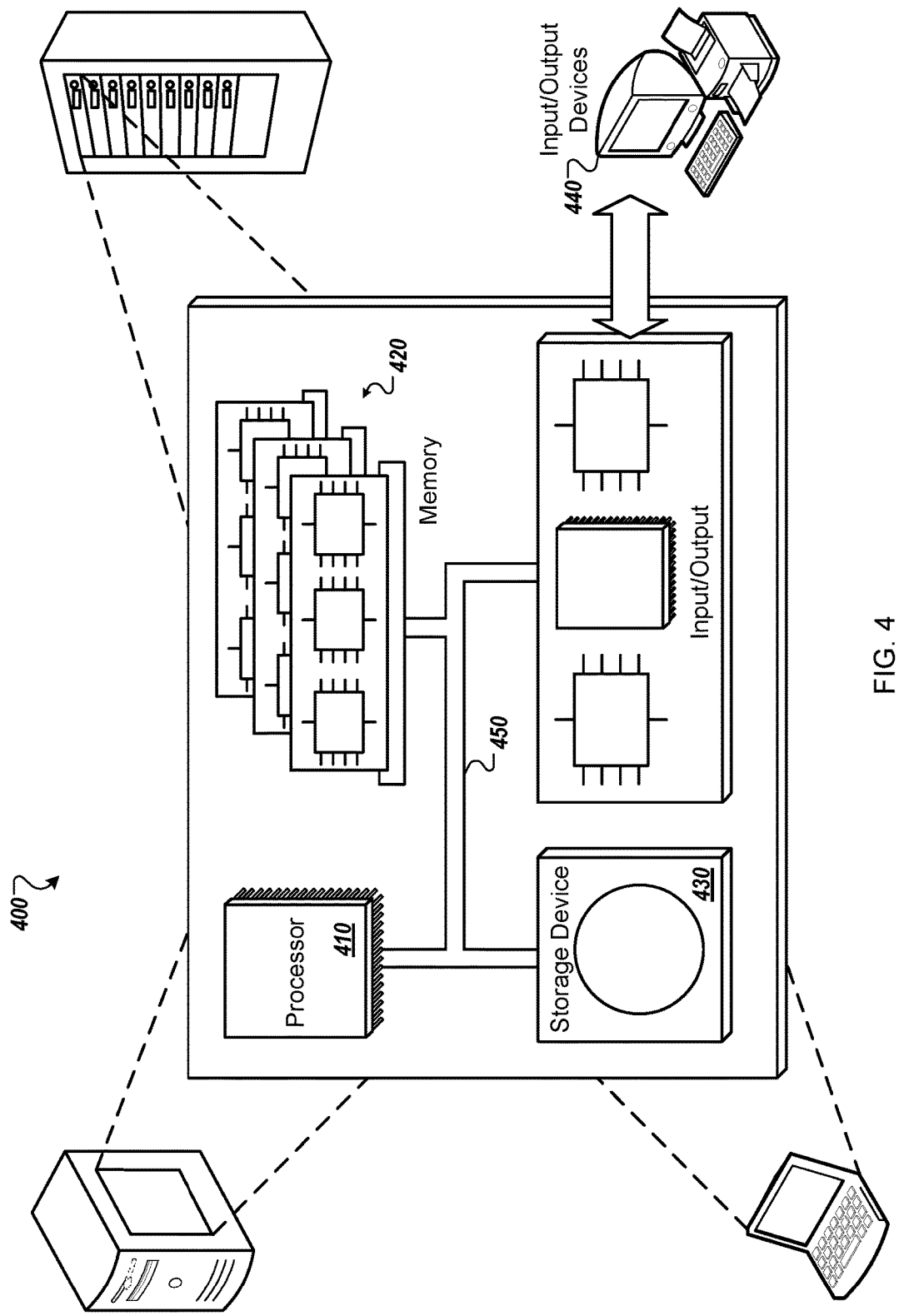
FIG. 4 is a block diagram of a computing system that can be used in connection with computer-implemented methods described in this document.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, by a first computer-implemented agent for a user device, a digital representation of speech encoding an utterance that includes a command; and
   in response to processing the digital representation of the speech to determine words included in the utterance:
   determining, using the words of the utterance, to request input identifying a sentiment of a user who spoke the utterance;
   in response to determining to request input identifying a sentiment of the user who spoke the utterance, providing a request for user input identifying a sentiment;
   as a result of providing the request for user input identifying a sentiment, receiving user input identifying a sentiment of a speaker of the utterance;
   identifying, by the first computer-implemented agent using the words included in the utterance, a second computer-implemented agent that is most likely able to perform the command, the second computer-implemented agent being a different computer-implemented agent from the first computer-implemented agent; and
   in response to identifying the second computer-implemented agent that is most likely able to perform the command, providing, by the first computer-implemented agent to the second computer-implemented agent, data for the utterance and the sentiment of the speaker of the utterance to cause the second computer-implemented agent to provide a response to the command based on the sentiment of the speaker.

2. The computer-implemented method of claim 1, wherein:
   the first computer-implemented agent executes on a first system;
   the second computer-implemented agent executes on a second system that is a different system from the first system; and
   providing, by the first computer-implemented agent to the second computer-implemented agent, data for the utterance and the sentiment of the speaker of the utterance to cause the second computer-implemented agent to provide a response to the command based on the sentiment of the speaker comprises providing, by the first computer-implemented agent to the second computer-implemented agent using a network, the data for the utterance and the sentiment of the speaker.

3. The computer-implemented method of claim 1, wherein identifying the second computer-implemented agent that is most likely able to perform the command comprises identifying the second computer-implemented agent that is most likely able to perform the command using the words of the utterance and a purpose for the second computer-implemented agent.

4. The computer-implemented method of claim 3, wherein identifying the second computer-implemented agent that is most likely able to perform the command comprises:
   determining, using the words of the utterance, a type of the command;
   in response to determining the type of the command, determining, using the type of the command, that two or more other computer-implemented agents are able to perform the type of the command, the two or more other computer-implemented agents including the second computer-implemented agent;
   in response to determining that two or more agents are able to perform the type of the command, determining, for each of the two or more other computer-implemented agents, a likelihood that the respective computer-implemented agent is able to perform the command using a purpose of the respective computer-implemented agent; and in response to determining the likelihoods for each of the two or more other computer-implemented agents, selecting, as the second computer-implemented agent, the computer-implemented agent from the two or more other computer-implemented agents that has the highest respective likelihood that the computer-implemented agent is able to perform the command.

5. The computer-implemented method of claim 1, wherein the command comprises a request for results responsive to the utterance.

6. The computer-implemented method of claim 1, wherein providing the request for user input identifying a sentiment comprises requesting user input identifying a yes or a no response to a question.

7. The computer-implemented method of claim 1, wherein providing the request for user input identifying a sentiment comprises requesting user input identifying an option from a set of options.

8. The computer-implemented method of claim 1, wherein identifying the second computer-implemented agent that is most likely able to perform the command comprises identifying the second computer-implemented agent that is most likely able to perform the command using the words of the utterance and profile data for the user device.

9. The computer-implemented method of claim 8, wherein the profile data includes demographic information for the user who spoke the utterance.

10. A system comprising one or more computers and one or more storage devices on which are stored instructions that are operable, when executed by the one or more computers, to cause the one or more computers to perform operations comprising:
    receiving, by a first computer-implemented agent for a user device, a digital representation of speech encoding an utterance that includes a command; and
    in response to processing the digital representation of the speech to determine words included in the utterance:
        determining, using the words of the utterance, to request input identifying a sentiment of a user who spoke the utterance;
        in response to determining to request input identifying a sentiment of the user who spoke the utterance, providing a request for user input identifying a sentiment;
        as a result of providing the request for user input identifying a sentiment, receiving user input identifying a sentiment of a speaker of the utterance;
        identifying, by the first computer-implemented agent using the words included in the utterance, a second computer-implemented agent that is most likely able to perform the command, the second computer-implemented agent being a different computer-implemented agent from the first computer-implemented agent; and
        in response to identifying the second computer-implemented agent that is most likely able to perform the command, providing, by the first computer-implemented agent to the second computer-implemented agent, data for the utterance and the sentiment of the speaker of the utterance to cause the second computer-implemented agent to provide a response to the command based on the sentiment of the speaker.

11. The system of claim 10, wherein:
the first computer-implemented agent executes on a first system;
the second computer-implemented agent executes on a second system that is a different system from the first system; and
providing, by the first computer-implemented agent to the second computer-implemented agent, data for the utterance and the sentiment of the speaker of the utterance to cause the second computer-implemented agent to provide a response to the command based on the sentiment of the speaker comprises providing, by the first computer-implemented agent to the second computer-implemented agent using a network, the data for the utterance and the sentiment of the speaker.

12. The system of claim 10, wherein identifying the second computer-implemented agent that is most likely able to perform the command comprises identifying the second computer-implemented agent that is most likely able to perform the command using the words of the utterance and a purpose for the second computer-implemented agent.

13. The system of claim 12, wherein identifying the second computer-implemented agent that is most likely able to perform the command comprises:
    determining, using the words of the utterance, a type of the command;
    in response to determining the type of the command, determining, using the type of the command, that two or more other computer-implemented agents are able to perform the type of the command, the two or more other computer-implemented agents including the second computer-implemented agent;
    in response to determining that two or more agents are able to perform the type of the command, determining, for each of the two or more other computer-implemented agents, a likelihood that the respective computer-implemented agent is able to perform the command using a purpose of the respective computer-implemented agent; and
    in response to determining the likelihoods for each of the two or more other computer-implemented agents, selecting, as the second computer-implemented agent, the computer-implemented agent from the two or more other computer-implemented agents that has the highest respective likelihood that the computer-implemented agent is able to perform the command.

14. The system of claim 10, wherein the command comprises a request for results responsive to the utterance.

15. The system of claim 10, wherein providing the request for user input identifying a sentiment comprises requesting user input identifying a yes or a no response to a question.

16. The system of claim 10, wherein providing the request for user input identifying a sentiment comprises requesting user input identifying an option from a set of options.

17. The system of claim 10, wherein identifying the second computer-implemented agent that is most likely able to perform the command comprises identifying the second computer-implemented agent that is most likely able to perform the command using the words of the utterance and profile data for the user device.

18. The system of claim 17, wherein the profile data includes demographic information for the user who spoke the utterance.

19. A non-transitory computer readable storage medium storing instructions executable by a data processing apparatus and upon such execution cause the data processing apparatus to perform operations comprising:
    receiving, by a first computer-implemented agent for a user device, a digital representation of speech encoding an utterance that includes a command; and in response to processing the digital representation of the speech to determine words included in the utterance:

determining, using the words of the utterance, to request input identifying a sentiment of a user who spoke the utterance;

in response to determining to request input identifying a sentiment of the user who spoke the utterance, providing a request for user input identifying a sentiment;

as a result of providing the request for user input identifying a sentiment, receiving user input identifying a sentiment of a speaker of the utterance;

identifying, by the first computer-implemented agent using the words included in the utterance, a second computer-implemented agent that is most likely able to perform the command, the second computer-implemented agent being a different computer-implemented agent from the first computer-implemented agent; and in response to identifying the second computer-implemented agent that is most likely able to perform the command, providing, by the first computer-implemented agent to the second computer-implemented agent, data for the utterance and the sentiment of the speaker of the utterance to cause the second computer-implemented agent to provide a response to the command based on the sentiment of the speaker.

20. The computer readable storage medium of claim 19, wherein:

the first computer-implemented agent executes on a first system;

the second computer-implemented agent executes on a second system that is a different system from the first system; and providing, by the first computer-implemented agent to the second computer-implemented agent, data for the utterance and the sentiment of the speaker of the utterance to cause the second computer-implemented agent to provide a response to the command based on the sentiment of the speaker comprises providing, by the first computer-implemented agent to the second computer-implemented agent using a network, the data for the utterance and the sentiment of the speaker.

* * * * *